United States Patent [19]

Mezzanotte et al.

[11] 4,295,511
[45] Oct. 20, 1981

[54] RADIAL TIRES PROVIDED WITH A STIFFENING STRUCTURE IN THE SIDEWALLS

[75] Inventors: Mario Mezzanotte, Milan; Gianni Turchetti, Bresso, both of Italy

[73] Assignee: Societa Pneumatici Pirelli S.p.A., Milan, Italy

[21] Appl. No.: 136,352

[22] Filed: Apr. 1, 1980

[30] Foreign Application Priority Data

Apr. 10, 1979 [IT] Italy ................................ 21708 A79

[51] Int. Cl.³ ............................................... B60C 9/06
[52] U.S. Cl. ......................... 152/354 R; 152/354 RB; 152/361 FP; 152/362 CS
[58] Field of Search ........ 152/353 R, 354 R, 354 RB, 152/355, 356 R, 361 R, 361 FP, 361 DM, 362 R, 362 CS

[56] References Cited

U.S. PATENT DOCUMENTS

| | | | |
|---|---|---|---|
| 3,703,203 | 11/1972 | Simpson | 152/354 |
| 4,023,608 | 5/1977 | Meiss | 152/362 R |
| 4,047,551 | 9/1977 | Mezzanotte | 152/354 R |
| 4,129,162 | 12/1978 | DeWitt | 152/354 RB |
| 4,166,491 | 9/1979 | Mezzanotte | 152/354 R |
| 4,231,409 | 11/1980 | Mezzanotte | 152/354 R |

Primary Examiner—John E. Kittle
Attorney, Agent, or Firm—Stevens, Davis, Miller & Mosher

[57] ABSTRACT

A pneumatic tire for vehicle wheels having a radial carcass is provided with an annular reinforcing structure inserted between the carcass and tread. The annular reinforcing structure is substantially inextensible and has a width which is at least as wide as the tread. The tire is provided in each sidewall with a mixed textile-metallic reinforcement member which has a strip which forms two skirts of different widths. The cords of the skirts are inclined with respect to the radial direction of the carcass cord. A second strip of metallic cords inclined with respect to the radial direction and narrower than the longer skirt is inserted between the skirts to the folded-edge. The larger skirt is disposed axially outside of the carcass ply and its turned over portion and radially extended from the bead zone to the tire's shoulder. The smaller skirt extends radially towards the inside from the shoulder to a point disposed in the sidewall, to a height between 66% and 20% of the tire's section height.

10 Claims, 1 Drawing Figure

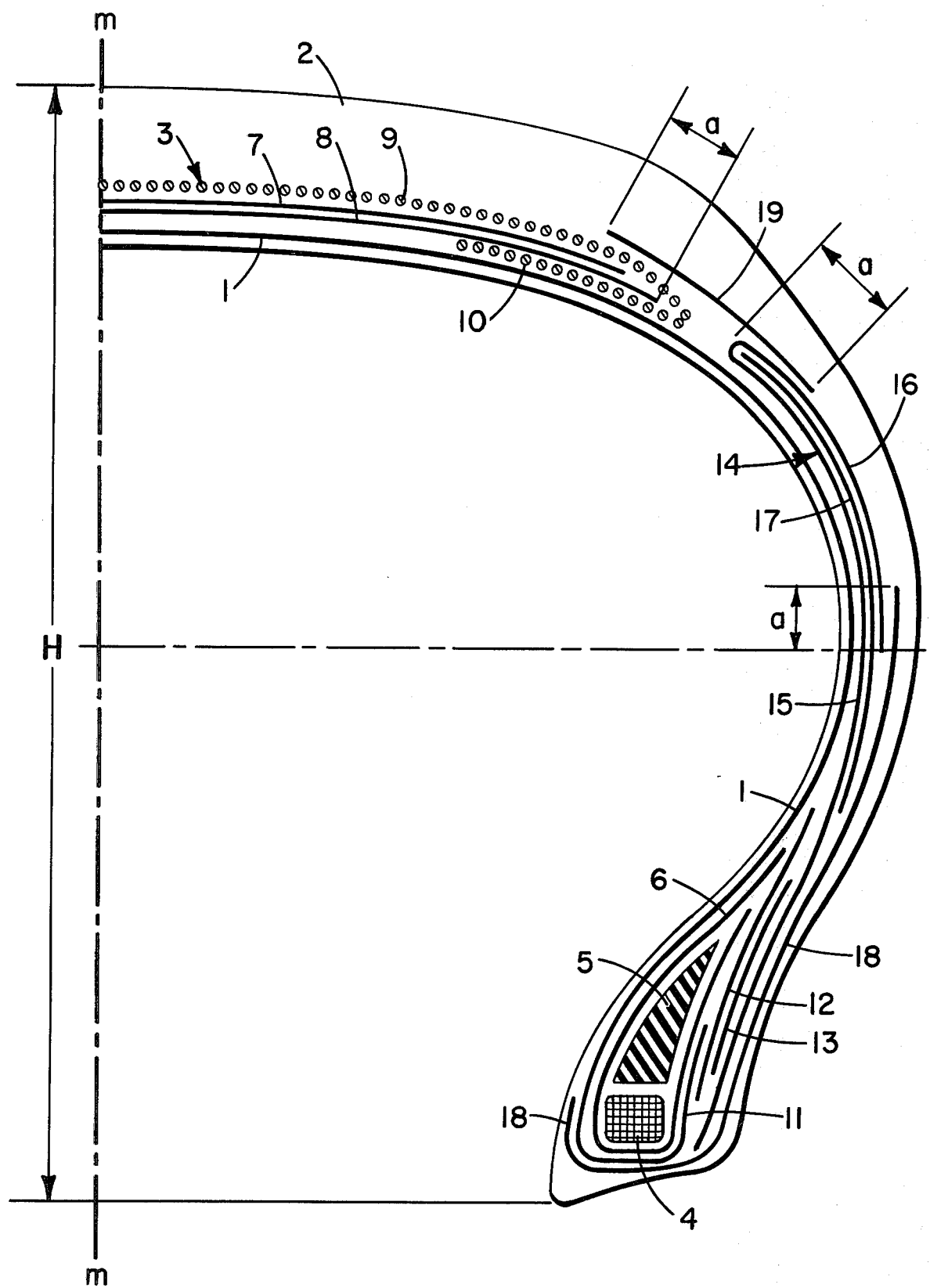

RADIAL TIRES PROVIDED WITH A STIFFENING STRUCTURE IN THE SIDEWALLS

This invention relates to radial tires i.e. those tires provided with a carcass formed by cords lying in radial planes, or forming small angles with the radial planes, and, more particularly, to an improvement in the stiffening structure in the sidewalls of this type of tire.

It is known that pneumatic tires having a radial carcass must have an annular reinforcing structure that is inextensible and disposed circumferentially between the carcass and tread. The annular structure resists both the forces due to the pressure within the tire as well as the tractional and compression stresses to which the tire is subjected during exercise. These stresses are particularly high when such tires are used in heavy duty service at high speeds, such as, for example, as sports-car tires. In particular, a reinforcing structure that is particularly well suited for such high performance tires is the structure which is provided with two metallic cord layers having cords inclined at substantially low angles (between 10°–35°) with respect to the equatorial plane of the tire, and over which there is disposed a layer of nylon cords oriented with the tire's circumferential direction.

This type of tire has proven to be very safe and to have good road behavior even under critical or extreme road conditions.

On the other hand, as regards the tire sidewalls, radial tires are 'known' to have a high degree of flexibility in every direction, i.e. in the radial, the transverse, as well as in the circumferential sense. The flexibility, in the radial direction of the tire is advantageous because the riding comfort of the tire is good, whereas transverse flexibility causes the disadvantage of having excessive deformation in the tire that is subjected to stresses in the perpendicular direction of its equatorial plane as, for example, in instances of road drifting, or in a curved trajectory, or due to lateral wind thrusts.

It can happen that, under these conditions, the excessively deformed tire may travel with its flanks directly in contact with the ground thus involving the risk of damaging the tire and, in any case, compromising the road-grip and the service life of the tire.

As for the flexibility in the circumferential sense, a lag in tire-response during any sudden acceleration and/or deceleration results, in addition to excessive and damaging deformation to the structure.

Hence, stiffening the radial tire sidewalls is required, but it must be kept in mind nevertheless, that a too rigid type of reinforcing structure is disadvantageous because of a lack of a cushioning effect for the stresses caused by the presence of irregularities in the road surface.

Modifications have been proposed for stiffening the sidewalls, and, at the same time, for safeguarding the desired flexibility. Such modifications generally consist in introducing inside the lower sidewall portion, and in a position axially external to the carcass turn, strips of textile and/or metallic cords that are inclined at various angles, and are in some cases, also wrapped around the beads (to form the so-called "flippers"), and which extend radially from the bead zone up to about one-half of the section height of the tire. This improves the transverse rigidity of the tire without causing any substantial detriment to the radial flexibility of the sidewalls.

Besides using these generic structural characteristics, it has been found that favorable results are obtained in tires which have in their sidewalls strips of either textile or metallic cords, inclined with respect to the circumferential line of the tire (they may also be doubled-up by being folded over) and extending from the bead cores up to the tire shoulders, or even between the belt layers.

In this way, the tires perform well even under abnormal running conditions, in particular, under high speed running conditions.

Nevertheless, it has also been found, that these types of tires intended to be run at high speeds in race-tracks (at speeds of about 250 km/h and over), can nevertheless, be improved in transverse and circumferential carcass rigidity and also in sensitivity to driving and to prompt steering response.

Hence, one object of this invention, is to provide a pneumatic tire for vehicle wheels, that has a radial carcass and tire beads for being mounted on a wheel rim, a tread, and an annular reinforcing structure inserted between the carcass and tread, and substantially circumferentially inextensible. The reinforcing member is at least as wide as the tread and the carcass has at least one ply of textile cords or metallic cords lying in substantially radial planes and extending from one bead to another, and turned-up from the inside towards the outside of the tire, around a bead-core contained in each bead. The tire is characterized in that it comprises in each sidewall, a mixed textile-metallic reinforcing structure comprising a strip of textile cords doubled-up over itself in such a way as to present two skirts having different widths, the cords of the skirts being inclined with respect to the radial direction of the carcass cord, and by a strip of metallic cord, also inclined with respect to the radial direction and having a smaller width to that of the larger skirt, inserted between the skirts up to the folded-edge of the textile strip, the larger skirt being disposed axially outside of the carcass ply and its turn-up, and radially extended from the bead zone to the said tire shoulder, the smaller skirt extending radially towards the inside from the shoulder to a point situated in the sidewall, to a height between 66% and 20% of the tire's section height, the metallic cord strip extending from the folded-edge of the textile strip, to a point situated at a height between 50% and 20% of the section height of the tire.

According to one advantageous embodiment of the invention, the nylon textile cords i.e. aliphatic polyamide cords, of the skirts are symmetrically inclined with respect to the radial direction of the carcass cord and at an angle between 15° and 45°, and in particular 25°. Thus, even the cords of the metal strip are inclined with respect to the radial direction and at an angle between 15° and 45°, and in particular substantially equal (25°) to that of the textile cords. These metallic cords are moreover, constituted of metallic wires having diameters that are variable between 0.12 and 0.25 mm, and in particular, equal to 0.12 mm.

As regards the position of the skirts in the tire sidewall, the larger skirt is situated axially outside not only of the carcass ply and its turn-up, but also of all the other reinforcements (either textile or metallic) that are situated in the bead-heel. The skirt having a smaller width, is moreover, axially outside of the larger skirt. As a result, even the metallic strip is axially outside the larger skirt. The mixed reinforcement, just described above, is also conveniently protected towards the outside, in consideration of possible accidental casualties occurring to the sidewall, by means of a woven-fabric chafer strip overlapping the radially inner margin of the smaller skirt, and extending from the zone of this overlapping to the tire bead where it is wound, from the outside towards the inside, around the bead-core. Preferably, the reinforcing cords of the woven-fabric chafer strip, are inclined at substantially 45° with respect to the radial direction of the carcass cords, but they can nevertheless be inclined at any desired angle.

Finally, quite advantageously, the mixed reinforcement is connected to the annular structure by means of a small textile cord strip (advantageously, nylon cord) disposed axially outwardly to both, the annular structure, and to the mixed reinforcement. The small cord strip is wide enough to overlap both the annular structure and the mixed reinforcement member. The cords of this small strip are conveniently oriented with respect to the radial direction of the carcass cord, at an angle of 90° to 45°, and in particular, at 80°.

In any case, this invention will be better understood through the following description and the FIGURE (given only by way of non-limiting example) that illustrates an advantageous embodiment of the tire of the invention, in a cross-section with regard to the radial plane, and limited to one-half with regard to the tire's equatorial plane m—m, the tire being symmetrical with respect to the plane.

Hence, as was previously suggested, the tire has a radial type carcass, comprising at least one ply 1 of cords lying in radial planes in the tire, a tread 2, and an annular reinforcing structure 3 which is substantially inextensible circumferentially, and which is referred to herein simply as the "belt".

The carcass ply extends from one bead to the other and is turned-up on each bead, from the inside towards the outside of the tire, around the bead-core 4, the circumferentially inextensible core guaranteeing the anchoring of the tire on its respective mounting rim (not illustrated).

Over the bead-core 4, there is placed a filler 5 made of rubber having a hardness greater than 70° Shore-A, and the 'beadcore-filler' assembly is wound onto a flipper 6 made of a ply of nylon cords inclined at an angle of 30° to 45°, with respect to the radial direction of the carcass cords.

The belt 3 has two layers 7 and 8, of metallic cords which are disposed parallel to each other in each layer, across the metallic cords of the adjacent layer, and inclined symmetrically with respect to the tire's equatorial plane, at a small angle, i.e. between 10° and 35°.

In a radially external position to the two layers, there is disposed a third layer 9 of cords made of a material which shrinks in length when heated i.e. for example, nylon; the cords being oriented according to the longitudinal direction of the tire, and with the layer being conveniently extended axially towards the outside with respect to the underlying layers.

In its complex whole, the belt has substantially the same width as the tread—i.e. as that portion of the tire's radially external surface that (under normal, straight running conditions) is always in contact with the ground. Besides this, quite conveniently, the belt, is completed at either of its extremities, by additional small strips 10 made of the very same cords as the layer 9, and being equally oriented according to the longitudinal direction, with the small strips 10 being disposed in a radially inner position with respect to the remaining belt layers. It is clear that these small strips can quite easily be realized by turning-up the textile layer 9 (made of a convenient width) axially towards the inside, and around the two metallic cord layers. The cited small strips have manifested to be extremely useful in impeding any detaching of the extremities of the metallic cord layers from the the surrounding rubber. Said detaching may otherwise be verified during running at high speeds—as a consequence of the phenomena that are well-known to technicians as the "dynamic wave", the "out limit" or the so-called "plate effect".

In an equally 'known' way, the tire beads illustrated, are reinforced by two strips of metallic cords, disposed in axially external positions with respect to the turn-ups 11 of the carcass plies.

The axially innermost strip 12, is comprised by metallic cords that are inclined with respect to the direction of an angle variable between 5° and 15° when passing from the bead zone at the radially outer edge; said strip being preferably disposed in correspondence of the neutral flexional axis.

The axially outermost strip 13, is—in turn, comprised by metallic cords of the HE type (High Elongation), disposed at 90°—i.e. according to the radial direction parallel to the carcass.

Coming now to the tire sidewalls, quite advantageously—and according to the invention, these are stiffened by means of a mixed textile-metallic reinforcement. This reinforcement (14) consists of a doubled-up nylon-cord fabric strip disposed in the tire shoulder zone—so as to originate two skirts, each one having a diverse width to the other, and with the larger skirt (15) extending radially towards the inside said shoulder—up to the lower bead zone; and with the smaller skirt (16) extending—also radially, towards the inside, from the shoulder up to a point situated at a height between 66% and 20% of the section height H of the tire.

Within the flipper (comprised by the two skirts 15 and 16) and contacting the folded-edge, there is disposed a further strip (17) of metallic cords that extend radially towards the inside, and even beyond the edge of the smaller skirt—up to a point situated at a height between 50% and 20% of the said section height H of the tire.

The textile cords of the two skirts are inclined in the opposite sense—with respect to the radial direction of the carcass cord, owing to the folding of the strip; and, in particular, they are symmetrically inclined at an angle of 25°—i.e. comprised within the preferred range of 15° and 45°.

Thus, also the metallic cords of the strip 17, are inclined with respect to the radial direction of the carcass cord, and, in particular, according to the same angle of 25°—likewise within the preferred range of 15° and 45°.

These metallic cords are also rather thin in such a way as not to sensibly influence the flexibility of the sidewall in the radial direction, and for the purpose of maintaining a good degree of riding-comfort. In practice, it is best for the diameter of the single metallic wires that form the cord, to be between 0.12 and 0.25 mm.

By way of example: for the type of tire illustrated in the drawing, there have been utilized to advantage, the 1×4×0.12 cords (single component strand of four wires each having a diameter of 0.12 mm), and the 3×3×0.12 cords.

As far as specifically concerns the formation of the mixed reinforcement, the preferred embodiment of the tire, as illustrated in the drawing, has the larger skirt in a position that is axilly external to the turn-up of the carcass ply, as well as to the metallic strips 12 and 13 of the bead reinforcement; and for the smaller skirt, and, consequently, also for the strip 17, in an axially external position with respect to the larger skirt.

It was found possible, moreover, to further improve the structure illustrated here, by having a protection against any accidental damages by means of disposing, towards the outside of the sidewall, in the lower half of the sidewall and in the axially external position, a chafer-strip (18) made of a woven fabric i.e., with 'warp-and weft' reinforcing cords that are criss-crossed together at substantially 90°. To be more precise, it must be remembered that the 'warp' cords are those cords that are disposed longitudinally in the piece of fabric; while the 'weft' cords are those cords that are disposed transversely.

This chafer-strip extends from the margin of the smaller skirt (16) of the mixed reinforcement, over which it is superimposed, to the bead zone, and with it being turned-up, from outside towards the inside, around the bead-core. The cords of this chafer-strip are suitably of nylon, and the 'warp' cords are inclined at an angle of substantially 45° but they can however, be of any desired value with respect to the radial direction of the carcass cords.

Besides this, there is quite conveniently shown the connection between the mixed reinforcement member and the belt, through the use of a small strip (19) of textile cords disposed in the tire shoulder in an axially outer position with regard to both, the belt (3), and the mixed reinforcement member (14); strip (19) having a width that is sufficient for superimposing both of these structures. As regards this, it is also well to explain here, that, according to what has been illustrated in the drawing, the linear development of the covering tracts "a" of the strip 19, for the belt (in the radially external position), and for the reinforcement member 14 (in the radially internal position), and so also in the case of the woven chafer-strip 18, for the skirt 16, has at least the usual dimensions for these "overlappings" of the diverse strips, as in the tire technology, i.e. in the order of about 10 mm, independently of the carcass dimensions, at least as far as regards the field of car tires. Concerning the inclination of the cords of the small strip 19, with respect to the radial direction of the carcass cords, it is best for this inclination to be between 90° and 45° (this inclination, for the tire herein described and illustrated, being about 80°).

Above all, the purpose of the strip 19 is to grade, with continuity, the existing variations in the rigidity, i.e. passing from the belt extremity to the tire shoulder, and once again, from the shoulder zone to the upper extremity of the sidewall, in correspondence of the folding in the reinforcement 14. This being apart from the purpose of serving, jointly with the carcass ply, for resisting the flexional stress which are concentrated here, i.e. in the shoulder zone, between the belt and the reinforcement, due to the greater rigidity of these above-said two structures with respect to that of the single carcass ply.

Furthermore, the greater flexibility in the tire shoulder zone, has been deliberately created for the purpose of disconnecting the tread from the sidewalls, for, in this way, it is possible for these two tire portions to have quite different and precisely predicted 'road-behavior' characteristics, and especially when in the presence of any forces that are directed perpendicularly to the equatorial plane of the tire.

The tire provided by the invention, in fact, has shown itself to possess excellent 'road behavior' qualities—both, at high speeds, and under severe condition—such as in racing of sports cars, and also demonstrates, in particular, a high sensibility to steering response, with good handling characteristics being verified during exercise.

It is to be understood, that the above description has been made solely by way of non-limiting example, and that variations can be made by those skilled in the art without departing from the spirit and scope of the invention except as it may be limited by the claims.

What is claimed is:

1. A pneumatic tire for vehicle wheels comprising a radial carcass provided with beads for assembly with a corresponding rim, a tread, and an annular reinforcing structure inserted between the carcass and tread, said annular reinforcing structure being substantially inextensible and having a width which is at least as wide as the tread, said carcass comprising at least one ply of textile or metallic cords lying in substantially radial planes and extending from one bead to another, and turned-up from the inside towards the outside of the tire, around a bead-core contained in each bead, said tire being characterized in that it comprises in each sidewall, a mixed textile-metallic reinforcement member comprising a strip of textile cords doubled over to provide two skirts having different widths, the cords of said skirts being inclined with respect to the radial direction of the carcass cord, and by a strip of metallic cords inclined with respect to said radial direction and narrower then the longer skirt inserted between said skirts to the folded-edge of said strips, said larger skirt being disposed axially outside of said carcass ply and its turned over portion and radially extended from the bead zone to the tire's shoulder, the smaller skirt extending radially towards the inside from said shoulder to a point disposed in the sidewall, to a height between 66% and 20% of the tire's section height, said metallic cord strip extending from the folded edge of said textile strip to a point situated at a height between 50% and 20% of the section height of the tire.

2. The tire of claim 1, characterized by the fact that the textile cords of said skirts, are symmetrically inclined, with respect to the radial direction of the carcass cords, at an angle of 15° to 45°.

3. The tire of claim 1, characterized by the fact that the metallic cords of said mixed reinforcing strips are inclined with respect to the radial direction of the carcass cords, at an angle of 15° to 45°.

4. The tire of claim 1, characterized by the fact that the metallic cords of the said mixed reinforcing strip, are of metallic wires having a diameter between 0.12 mm and 0.25 mm.

5. The tire of claim 1, characterized by the fact that said larger skirt is disposed axially outwardly of all other reinforcing strips present in the bead.

6. The tire of claims 1, 2, 3, 4, or 5, characterized by the fact that said smaller skirt lies axially outside of the said larger skirt.

7. The tire of claim 6, characterized by the fact that said mixed reinforcing member is protected in the axially outward position, by a chafer-strip of a woven fabric overlapping the radially inner edge of said smaller skirt and extending from said overlapped zone, to the bead, and turning-up axially from the outside towards the inside, around said bead-core.

8. The tire of claims 1, 2, 3, 4 or 5, characterized by the fact that said mixed reinforcement member is connected with said annular reinforcing structure by means of a strip of textile cords disposed axially outside of said annular structure and outside of said reinforcement member, the width of said strip surmounting with its radially external portion the edge of said annular structure, and its radially inner portion surmounting the folded-edge of said mixed reinforcement member.

9. The tire of claim 8, characterized by the fact that the textile cords of said strip, are inclined with respect to the radial direction of the carcass cord, at an angle of 90° to 45°.

10. A pneumatic tire for a motor vehicle wheel having a radial carcass, sidewalls, beads for removably fixing the tire to a wheel rim, a tread, and between the carcass and tread an annular substantially inextensible reinforcing belt having a width at least equal to the tread width, and in each sidewall, a reinforcing member of mixed textile and metallic cords comprising a first strip of textile cords doubled to provide two skirts, one wider than the other and a second strip of metallic cords which is narrower than the first strip, said carcass comprising radial cords turned over said beads, said textile skirt disposed externally of the turned over portion of the carcass cords and extending radially from the tire's shoulder to a height of from 20% to 66% of the height of the tire, said second strip extending from the folded edge of the first strip to a height of 20% to 50% of the height of the tire.

* * * * *